Dec. 1, 1953

C. S. WOOLFORD ET AL 2,660,969

MAGNETIC CAN BODY SUPPORTING STRUCTURE

Filed March 23, 1951

INVENTORS
CUSTIS S. WOOLFORD
JOHN E. SOCKE.
BY
ATTORNEYS

Dec. 1, 1953 C. S. WOOLFORD ET AL 2,660,969
MAGNETIC CAN BODY SUPPORTING STRUCTURE
Filed March 23, 1951 3 Sheets-Sheet 2
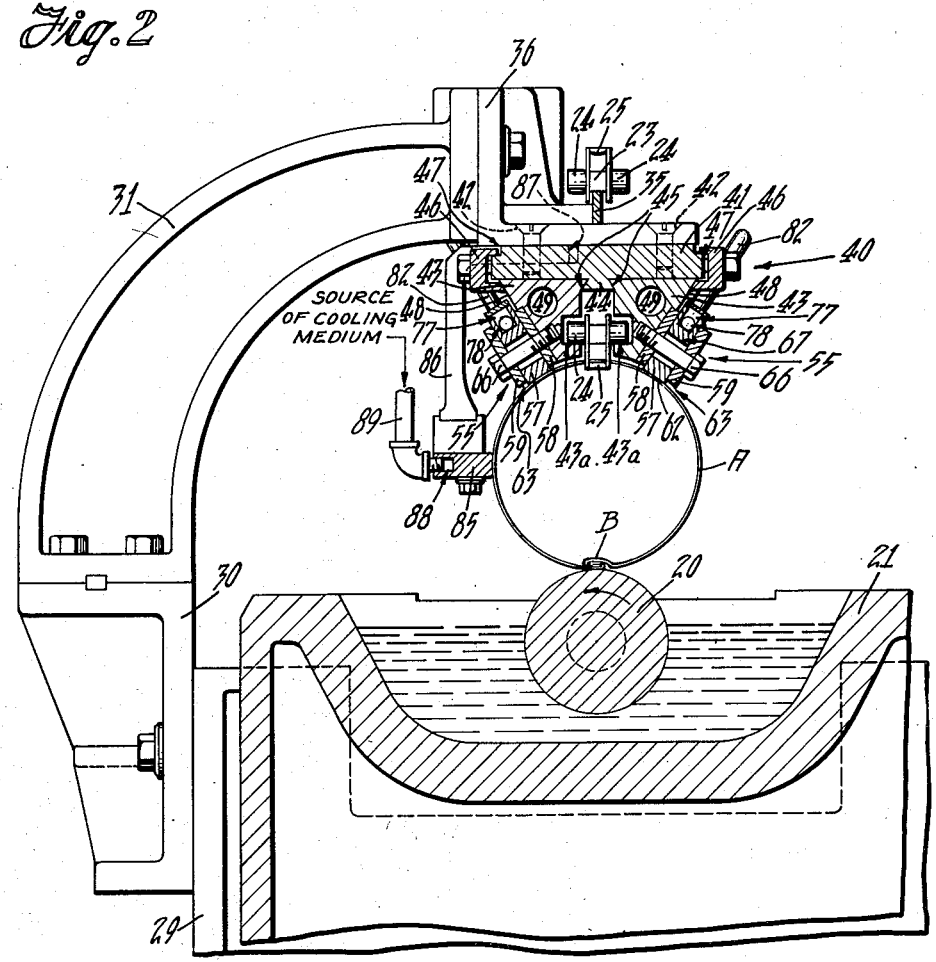
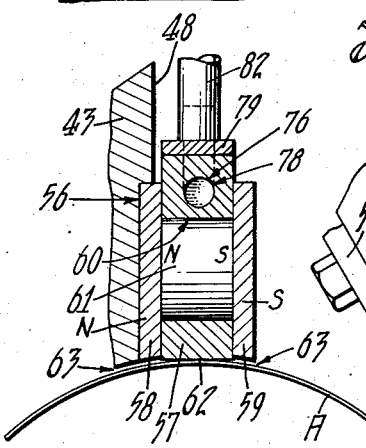
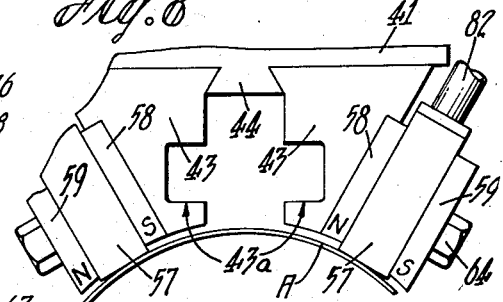
INVENTORS
CUSTIS S. WOOLFORD
JOHN E. SOCKE
BY
ATTORNEYS Dec. 1, 1953   C. S. WOOLFORD ET AL   2,660,969
MAGNETIC CAN BODY SUPPORTING STRUCTURE
Filed March 23, 1951   3 Sheets-Sheet 3
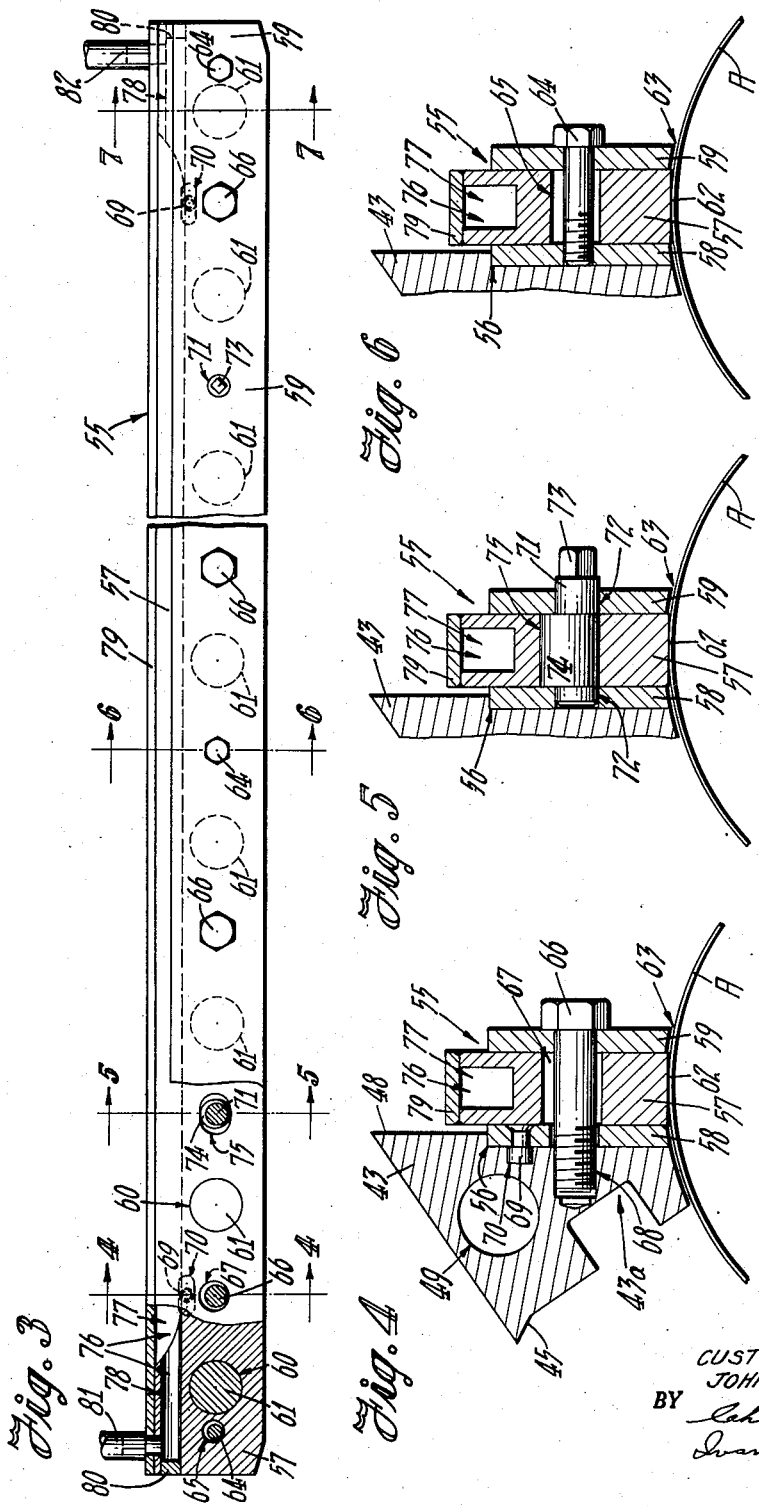
INVENTORS
CUSTIS S. WOOLFORD
JOHN E. SOCKE
BY
ATTORNEYS Patented Dec. 1, 1953

2,660,969

UNITED STATES PATENT OFFICE 2,660,969

MAGNETIC CAN BODY SUPPORTING STRUCTURE

Custis S. Woolford, South Orange, N. J., and John E. Socke, Pelham Manor, N. Y., assignors to American Can Company, New York, N. Y., a corporation of New Jersey Application March 23, 1951, Serial No. 217,224

4 Claims. (Cl. 113—60)

The present invention relates to a can body side seam soldering machine and has particular reference to a novel solder horse structure in which the can bodies are magnetically suspended by overhead magnets but are spaced from the supporting magnets by adjustable nonmagnetic tracks along which the bodies slide as they are advanced through the machine.

The conventional can body side seam soldering machine is provided with a can supporting structure, commonly referred to in the art as a solder horse, which is essentially a tubular, open-ended frame or cage which longitudinally encloses the can bodies and through which they pass as they are conveyed through the machine by a feed chain. These solder horses make frictional contact with each body at a number of localities around its periphery, with the result that the bodies are often scratched or marred, particularly when they are lithographed or enameled. Since these solder horses are non-yielding structures which closely surround the body wall, they sometimes cause jams when imperfectly formed bodies are fed into them. Furthermore, their construction prevents ready access to the can bodies in them and obstructs the operator's view of the operations being performed on the bodies.

Attempts have been made in the past to overcome these difficulties by providing magnetic solder horses to reduce the area of frictional contact between the can bodies and the horse. One design utilized electromagnets which are expensive, cumbersome, and difficult to maintain. Another used permanent magnets and was somewhat simpler in construction, but all of the prior constructions had certain inherent disadvantages which precluded their general commercial acceptance. These disadvantages sprang mainly from the fact that in these prior structures the bodies were slid directly along the magnet poles or pole pieces. Such direct contact between the bodies and the magnet poles is highly undesirable for several reasons. In the first place, permanent magnets possessing sufficient magnetic field intensity to properly support the bodies directly must necessarily be formed of structurally weak material which wears out rapidly when in contact with the bodies and thus necessitates frequent replacement which is expensive and time-consuming.

Another disadvantage is that sharp bits or particles of magnetizable materials such as steel or iron are always present in can manufacturing plants and are picked up and carried into the soldering machine by the bodies. These particles are strongly attracted by the magnets and many of them settle on and adhere tenaciously to the magnetic surfaces along which the can bodies slide. When thus accumulated, they act as abrasives and scratch the succeeding can bodies as they move along the magnets. It is extremely difficult to remove these particles from the magnets when the machine is stopped and practically impossible to keep the magnets free of them when the machine is operating.

Another disadvantage is that the mechanical force produced between the can bodies and the permanent magnets cannot be effectively varied when there is direct contact between them. It is necessary for the full-time utilization of a can body soldering machine that it be capable of use with bodies made from various types of materials such as black iron, tin plate, lithographed plate, etc. The magnetic characteristics of these materials vary and in order to obtain the proper and efficient operation of the machine it is often necessary to adjust the magnetic attraction of the magnets to the particular type of body material being run.

The present invention contemplates overcoming these and other disadvantages by having the bodies slide along nonmagnetic tracks interposed between the pole pieces of the permanent magnets which support the bodies. These tracks extend slightly beyond the faces of the pole pieces to create air gaps between the bodies and the pole pieces, and are mounted on eccentric pins to make it possible to adjust the air gaps to the material of the bodies and to compensate for the mechanical wearing away of the tracks due to friction. Since the tracks are nonmagnetic they remain free of the magnetic particles which are so damaging to the can bodies, and can be made from hard, durable materials such as bronze, certain types of stainless steel, and aluminum which has been treated to increase its resistance to wear. The tracks are easily replaceable and are water-cooled to prevent scorching of enameled or lithographed can bodies.

An object of the invention is the provision of a high speed can body side seam soldering machine wherein the friction between the solder horse and the bodies being conveyed through the horse is reduced to a minimum.

Another object of the invention is the provision of such a machine wherein the can bodies are magnetically supported but are kept out of frictional contact with the supporting magnet poles as they are moved through the machine in order to eliminate scratching due to foreign magnetic particles which are usually present on the pole faces.

Still another object of the invention is the provision in such a machine of a magnetic solder horse which is disposed around the top portion of the can bodies and provides sufficient space and an unobstructed view at the working stations of the machine to permit visual observation of the operation being performed on the moving bodies and ready removal of can bodies from the horse.

Yet another object is the provision of a magnetic solder horse wherein the nonmagnetic track which contacts the can bodies may be moved in a radial direction inwardly towards the axis of the bodies in order to compensate for wear, and wherein the track may be easily replaced when such adjustments can no longer be made.

A further object is the provision of a magnetic solder horse wherein the can bodies slide along inexpensive, replaceable, nonmagnetic can tracks, thus reducing the wear on the more expensive parts to a minimum.

Another object is to provide a solder horse fabricated of a number of component sections, each of which is readily accessible to the machine operator and can be readily disassembled to facilitate maintenance or replacement of parts.

Numerous other objects and advantages of the invention will be apparent as it is better understood from the following description, which, taken in connection with the accompanying drawings, discloses a preferred embodiment thereof.

Referring to the drawings:

Fig. 2 is a vertical transverse section taken substantially along the broken line 2—2 of Fig. 1 with parts broken away and parts in section;

Fig. 3 is an enlarged detail view of one of a pair of magnetic support units of the invention as viewed from the right in Fig. 2 with parts broken away and parts in section;

Figure 1:
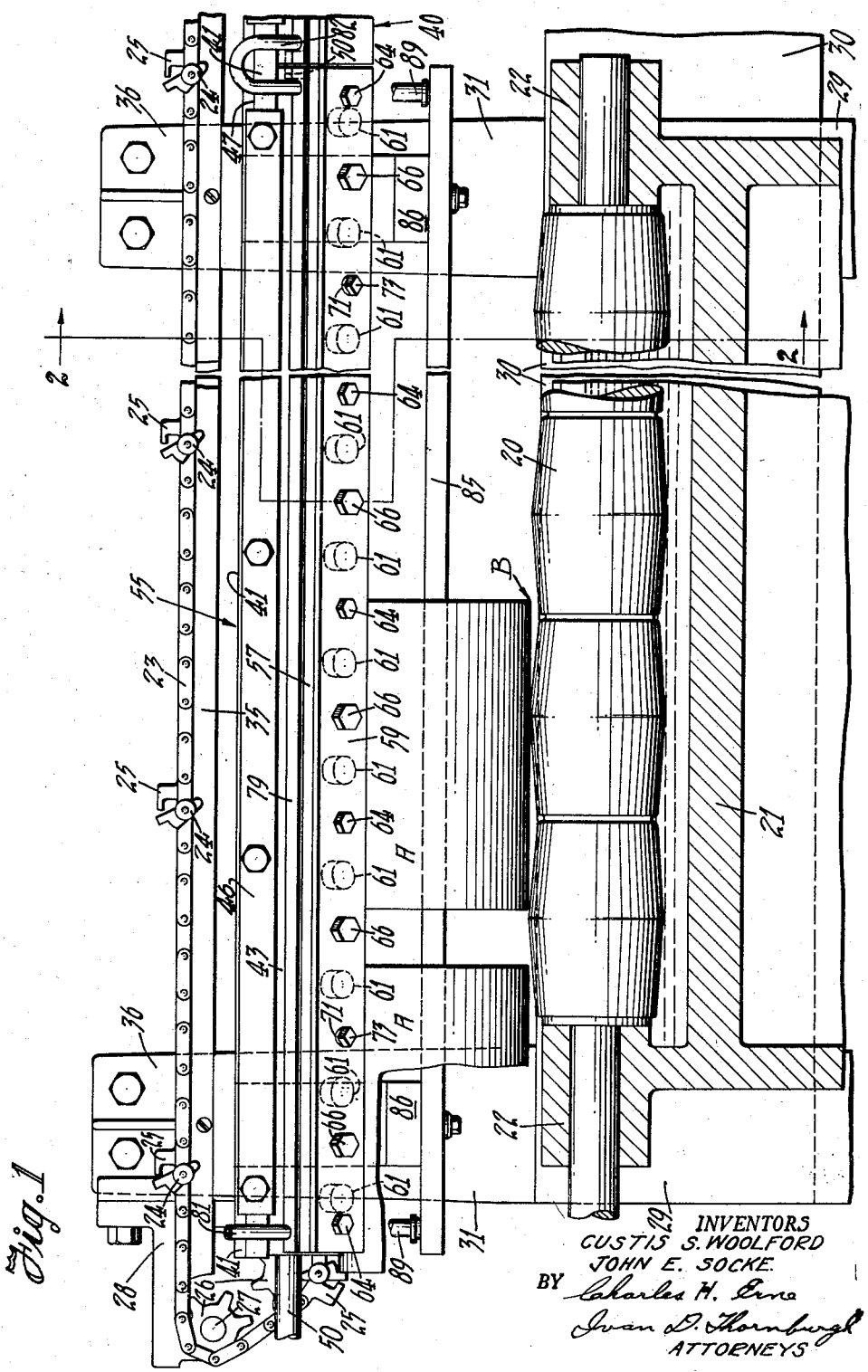
Figure 1 is a side elevational view of the solder bath section of a can body side seam soldering machine embodying the instant invention, with parts broken away and parts in section.

Figs. 4 through 7 are enlarged sectional details taken substantially along the lines 4—4, 5—5, 6—6 and 7—7, respectively, of Fig. 3 the views also including a portion of the chain track bar and portions of can bodies in position in the horse; and Fig. 8 is a schematic end view of the solder horse illustrating the preferred arrangement of the magnet pole pieces.

As a preferred or exemplary embodiment of the invention the drawings illustrate parts of a soldering machine of the general character disclosed in United States Patent No. 1,338,716, issued on May 4, 1920, to Magnus E. Widell entitled Soldering Machine. In this machine, the can bodies A are received in a horizontal position from a bodymaker with their side seams B at the bottom of the bodies in longitudinal alignment with each other. The side seams B are suitably fluxed, as shown in the Widell patent and the bodies A are then propelled endwise along a predetermined path of travel through a plurality of working stations in spaced and processional order. The first of these stations is a solder applying station at which the molten solder is applied to the side seams B of the moving bodies A by a solder roll 20 (Figs. 1 and 2) which is continuously rotated in a counterclockwise direction (as indicated by the arrow in Fig. 2) in any suitable manner. The solder roll 20 is partially immersed in molten solder contained in a heated solder bath or reservoir 21 and is journalled in bearings 22 formed in the reservoir 21 which is suitably mounted on the main frame of the machine.

After the solder has been applied, the excess solder is removed by a rotary wiping wheel or other suitable device at a wiping station. The soldered and wiped can bodies are then conveyed to a cooling station where a blast of air may be directed at the bodies to dissipate the heat in the bodies and thereby harden the solder in the seams. During their travel through the machine, the can bodies A are supported by a magnetic solder horse which extends the full length of the machine and which forms the subject matter of the present invention. Since the solder horse is built of a number of short component sections which are substantially uniform in construction throughout the machine, the present drawings, for the sake of simplicity, illustrate only the first section which extends through the solder applying station of the machine. A description of the other stations of the machine may be had by referring to the above mentioned Widell patent.

The can bodies A are propelled in spaced processional order through the machine by an endless chain conveyor 23 (Figs. 1 and 2) which extends the full length of the machine and has rollers 24 and gripper dogs or lugs 25 secured to it at spaced intervals. The dogs 25 are designed to firmly clamp onto the top rear ends of the can bodies A in order to prevent the side seams B from turning under pressure of the solder roll 20 and may be of the construction illustrated in United States Patent No. 2,319,281 issued on May 18, 1943 to William P. Winters and entitled Conveyer.

At the entrance end of the machine (to the left in Fig. 1) the chain conveyor 23 operates around a pair of small idler sprockets 26 mounted on short shafts 27 carried by a small bracket 28 mounted on the machine frame. The machine frame includes a plurality of supporting legs 29 and a longitudinal channel bar 30 to which are bolted a number of main brackets 31. The conveyor 23 is continuously driven at a constant speed through a driving sprocket mounted in the machine frame at the discharge end of the machine (not shown).

The upper flight of the conveyor 23 is supported on a longitudinal rail 35 mounted on small angle brackets 36 bolted to the main brackets 31. The lower flight of the conveyor is supported through the rollers 24 by the magnetic solder horse, generally designated by the numeral 40.

The solder horse 40 is mounted on an elongated mounting plate 41 which is secured to the angle brackets 36 by countersunk screws 42. Each section of the horse 40 includes a pair of transversely spaced, longitudinally extending nonmagnetic chain track bars 43 provided with trackways 43a which support the chain rollers 24. These chain track bars 43 preferably are substantially triangular in shape and are secured to the underside of the mounting plate 41. They are spaced from each other by an undercut or dovetail rib 44 which extends longitudinally along the center of the plate for the reception of flaring or tapered shoulders 45 (see also Fig. 4) formed at the upper inner edges of the bars 43. The track bars 43 are locked in place on the plate 41 by elongated substantially U-shaped channel bars 46 removably bolted to the sides of the plate 41. The upper legs of the channel bars 46 are supported on ledges 47 formed at the upper edges of the plate 41, while the lower legs engage against outer inclined walls 48 of the track bars 43 and co-operate with the undercut rib 44 to firmly hold the bars against the plate 41 in a dovetail joint.

The chain track bars 43 are provided with longitudinal bores 49 through which a cooling medium such as water is circulated. Tubes 50 are connected to the ends of the bores 49 and provide for the constant circulation of the water. This cooling of the solder horse, which is usually provided only at the solder-applying and wiping stations, is desired in modern high speed soldering machines since the bodies are usually preheated to facilitate soldering. The heat from the preheated bodies, plus the heat from the molten solder which may have a temperature as high as 600° F., would otherwise overheat the horse and cause warpage of its parts and softening or scorching of those areas of coated can bodies which contact the horse.

The can bodies A are supported during the passage through the machine by magnetic support units 55 (Figs. 4, 5, 6 and 7) mounted in recesses 56 in the inclined outer walls 48 of each track bar 43. There are two of these support units 55, one on each of the track bars 43 and they are disposed in a radial position relative to a can body A to be suspended from them. Each magnetic support unit 55 includes an elongated, can body track 57, along which the can bodies slide as they are propelled through the machine, interposed between an elongated inner pole piece 58 and an elongated outer pole piece 59 of opposite polarity. The track 57 and the pole pieces 58, 59 are substantially the same length. At spaced, predetermined intervals along its length, the track 57 is provided with a plurality of transverse bores 60 in which are disposed short permanent bar magnets 61 having their poles disposed transversely of the track (see Fig. 7). The magnets 61 are substantially equal in length to the transverse dimension of the track and are arranged with their pole faces in intimate contact with the pole pieces 58, 59 which are common to them, the north poles of all the magnets 61 contacting one pole piece and their south poles all contacting the other pole piece. The two magnetic support units should preferably be arranged circumferentially around the can bodies so that the pole pieces alternate in polarity, as shown in Fig. 8, in order to obtain maximum useful field intensity. The magnets 61 preferably are of the type commercially marketed under the trade names "Alnico" or "Nipermag," and are alloys of aluminum, nickel, cobalt, and iron and have high coercive force and external energy values. Such magnets are able to resist vibration and relatively high temperatures for long periods of time and exhibit great resistance to demagnetization resulting from long exposure to magnetic fields.

The can body track 57 preferably is made of a durable nonmagnetic material such as bronze, stainless steel, or treated aluminum. The inner, or can body contacting face 62 of the track 57 extends beyond or radially inwardly of the inner faces of the pole pieces 58, 59, thus forming spaces or air gaps 63 between the can bodies A and the pole pieces, and is preferably flat to minimize the area of contact with the bodies, although it may be curved on a radius equal to or greater than that of the bodies A, if desired.

The pole pieces 58, 59 are made of a highly permeable material such as iron or steel. The inner faces of the pole pieces are preferably, although not necessarily, curved to substantially conform to the curvature of the bodies A and thus make the air gaps 63 of uniform overall depth, which depth is somewhat exaggerated in the drawings for the sake of clarity of illustration.

Each can track 57 and its associated magnets 61 and pole pieces 58 and 59 are clamped tightly together by means of cross-bolts 64 which pass through oversized clearance openings 65 formed in the tracks 57 (see Figs. 3 and 6) and permit easy handling and replacement of these parts as a magnetic support unit 55. Each support unit 55 is rigidly secured to the chain track bar 43 by mounting bolts 66 (Fig. 4) which pass through oversized clearance openings 67 in the tracks 57 and are threaded into bores 68 formed in the track bar 43. The unit is accurately aligned radially of the bodies by locating pins 69, one of which is disposed at each end of the inner pole piece 58. The locating pins 69 are set into locating grooves 70 milled into the chain track bar 43 and are particularly useful as guides when the unit is being secured to the track bar.

In order to permit adjustment of the air gaps 63 to compensate for the wearing away of the can body tracks 57 or for variations in the magnetic characteristics of the can bodies A, each can body track 57 is mounted on two widely spaced eccentric pins 71 (Figs. 3 and 5), the ends of which are journaled in bearings 72 formed in the pole pieces 58, 59. The exposed or outer end of each pin 71 is formed with a squared head 73 so that the pins may be rotatably adjusted by a wrench after the clamping bolts 64 and mounting bolts 66 have been loosened slightly. The eccentric portions 74 of the pins 71 operate in longitudinal slots 75 formed in the tracks 57. These slots 75 have a height just equal to the thickness of the eccentric 74 so that rotation of the pins 71 results in a movement of the body tracks 57 which is radial with respect to the can bodies A. This movement may be either inward or outward depending upon the direction in which the eccentrics 71 are turned. As illustrated in the drawings, the tracks 57 are in their outermost position. The tracks 57 thus may be moved relative to the pole pieces 58 and 59, the oversized clearance openings 65 and 67 permitting such movement while the pins 69 and bolts 64 and 66 hold the pole pieces 58 and 59 stationary. In this manner, the original depth of the air gaps 63 can be maintained even though the tracks 57 may wear down, or the depth of the air gaps can be altered to accommodate different types of can bodies.

The tracks 57 are preferably formed with conduits 76 through which cooling water is circulated to prevent the overheating of the magnet support units 55. Each conduit is composed of a rectangular milled groove section 77 disposed intermediate the ends of the track 57, and bore sections 78 disposed at the ends of the track (see Fig. 3). The milled section 77 is capped with a nonmagnetic plate 79 brazed to the top of the track 57 and the ends of the bores 78 are closed by plugs 80. Cooling water is supplied to the conduit 76 from any suitable source through a flexible inlet tube 81 tapped into the front end of track bar 57.

As previously stated, the solder horse extends the full length of the machine and is constructed of comparatively short component sections which are closely spaced in end-to-end relationship to provide a substantially continuous structure. In the drawings, a short portion of the second section of the solder horse, which section extends through the wiping station of the machine, is shown at the right in Fig. 1. The body tracks 57 of this section are also water cooled and are formed with water conduits which are connected to the conduits of the first section by U-shaped flexible tubes 82 (see Figs. 1 and 2) which form a part of the circulatory system. The cooling water is discharged from the second section of the horse through discharge tubes (not shown) similar in construction to the inlet tubes 81.

The rotation of the solder roll 20 exerts considerable pressure against the moving can bodies A and has a tendency to distort them even though the bodies are prevented from turning by the magnetic attraction of the horse and the grip of the dogs 25. This is especially true when the bodies are large in diameter, since these bodies are more flexible than the smaller ones. It is therefore preferable to provide a counter-pressure bar 85 (Figs. 1 and 2) to prevent this distortion and insure proper application of the solder to the side seam B. The bar 85 extends the length of the solder applying station of the machine and is bolted to spaced inverted L-brackets 86 which fit into recesses 87 milled into the top of the mounting plate 41 and are held in place by a number of the screws 42 which secure the plate 41 to the angle brackets 36. The counter-pressure bar 85 preferably is formed with a conduit 88 through which cooling water is constantly circulated. Water pipes 89 threaded into the bar provide the necessary water connections.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A magnetic support unit for a can body treating machine, comprising a pair of spaced, parallel, longitudinally extending magnetizable pole pieces, means for creating a magnetic field in and around said pole pieces, and a nonmagnetic longitudinally extending track disposed between said pole pieces, said track having a can body contacting face extending beyond said pole pieces in the direction of said body to form air gaps separating the pole pieces from the body for minimizing the area of contact with said body, means for advancing said can body along said track, rotatable adjustment eccentrics each journalled at opposite ends in said pole pieces and supporting said track on an intermediate portion of the eccentric, whereby upon rotation of said eccentrics said track may be moved relative to said pole pieces to adjust said air gaps so that the body is held gently against the nonmagnetic track by said magnetic field.

2. In a machine for soldering the side seams of tubular sheet metal can bodies, the combination of a nonmagnetic can guide track, means for advancing the can bodies along a predetermined path of travel substantially parallel to said track, a plurality of permanent magnets supported in and traversing said nonmagnetic track, a pair of elongated depending pole pieces common to all of said magnets and disposed on opposite ends of said magnets in contact with said magnets, said nonmagnetic guide track being disposed between said pole pieces and extending beyond said pole pieces toward the axis of the can bodies to contact the bodies and create air gaps between the bodies and said pole pieces to minimize contact between said bodies and said track against which the bodies are attracted from across said air gaps by said pole pieces, and adjusting means traversing said pole pieces and track for changing the relative position of said track and said pole pieces to control said air gaps.

3. In a machine for soldering the side seams of tubular sheet metal can bodies, the combination of means for advancing the can bodies along a predetermined path of travel, a solder applying roll rotating transversely of said path of travel, a pair of spaced and parallel nonmagnetic tracks for simultaneously engaging the can bodies at circumferentially spaced localities on their upper surfaces and forming guides along which the bodies slide as they advance, each of said tracks having spaced longitudinal slots formed therein, magnet pole pieces disposed adjacent said nonmagnetic tracks and out of contact with the can bodies for creating a magnetic field for magnetically suspending the can bodies and holding them in engagement with said tracks, eccentric pins each passing through a said slot in a track and being journalled at opposite ends in the pole pieces adjacent said track for adjustably supporting said track, whereby upon rotation of said eccentric pins said tracks may be moved relative to the pole pieces adjacent thereto to adjust said air gaps so that each can body is held against the nonmagnetic tracks by said magnetic fields with a minimum of pressure as it is advanced along said solder applying roll.

4. A magnetic support unit for a can body treating machine, comprising a pair of spaced longitudinal magnetizable pole pieces having longitudinal can body attracting pole faces, means for creating a magnetic field in and between said pole pieces for attracting a can body toward said faces, a nonmagnetic longitudinal track having a can body engaging track face disposed between and extending beyond said pole pieces, means for advancing said can body along said track, and adjusting means engageable with said track for moving said track relative to said pole pieces to provide an adjustable air gap between the attracting pole faces of said pole pieces and a can body engaged by said track so that a desired effective intensity of said magnetic field may be created and maintained.

CUSTIS S. WOOLFORD.
JOHN E. SOCKE.

References Cited in the file of this patent
UNITED STATES PATENTS

| Number | Name | Date |
| --- | --- | --- |
| 1,534,677 | Assman | Apr. 21, 1925 |
| 2,535,853 | Hermani | Dec. 26, 1950 |